Nov. 24, 1953     E. J. HUNTER     2,660,192

SADDLE VALVE

Filed Nov. 22, 1952

Inventor

EDWIN J. HUNTER

By Lloyd Spencer

Attorney

Patented Nov. 24, 1953

2,660,192

UNITED STATES PATENT OFFICE 2,660,192

SADDLE VALVE

Edwin J. Hunter, Riverside, Calif.

Application November 22, 1952, Serial No. 322,119

5 Claims. (Cl. 137—318)

My invention relates to saddle valves and included in the objects of my invention are:

First, to provide a saddle valve which is particularly suitable for attachment to a water supply line in order to feed water to a small secondary line.

Second, to provide a saddle valve which incorporates a valve element so arranged as to serve as a tool for penetrating the pipe line, and which also incorporates a seal means so arranged as to maintain a seal around the penetrating element so that the saddle valve may be installed on a water supply line or other supply line carrying fluid under pressure without necessitating the shutting off of the water supply.

Third, to provide a saddle valve which is particularly economical of manufacture and which requires no tool other than a screwdriver in order to install it on a pipe line.

With the foregoing and other objects in view as may appear hereinafter, reference is directed to the accompanying drawings, in which.

Figure 1:
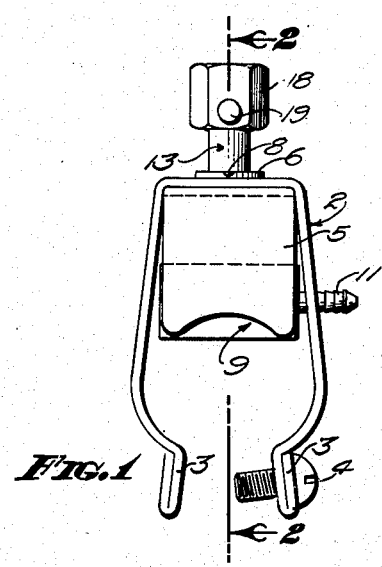
Figure 1 is a side view of my saddle valve shown prior to installation.
Figure 4:
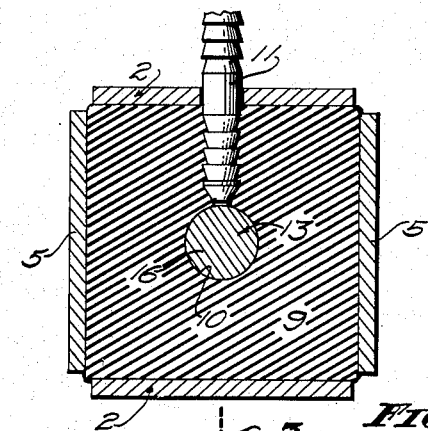
Figure 4 is a transverse sectional view through 4—4 of Fig. 2.

My saddle valve includes a rectangular metal block 1 over which is fitted an inverted U-shaped clamp strap 2. The strap 2 extends across the top and downwardly contiguous to two vertical sides of the block and then protrudes beyond the block 1, terminating in inwardly curved portions adapted to fit around opposite sides of a pipe P. The extremities of these portions are bent to form confronting lips 3 which receive screws 5 to attach the strap to a pipe.

Also folded over the metal block at right angles to the strap 2 is a second inverted U-shaped strap 5. The block 1 is provided with a centered internally threaded bore 6 terminating within a nipple 7 extending upwardly through the straps and staked at its upper end as indicated by 8 to secure the straps in place. The stakes 8 also mutilate the screw thread at the end of the bore 6.

Retained between the two straps below the metal block 1 is a seal block of rubber or rubberlike material. The seal block is provided with a vertical bore 10 alining with the bore 6 and a lateral bore into which is forced a nipple fitting 11 to which a small hose may be attached. One leg of the strap 2 is provided with a clearance slot 12 to receive the nipple fitting 11.

The bores 6 and 10 receive a combined valve and penetrating tool 13 which includes a stem 14 having a screwthreaded section 15 fitting the bore and limited in its outward travel by the staking 8. Below the screwthreaded section 15 there is formed a plug section 16 which sealingly fits the bore 10 of the seal block 9.

The lower extremity of the tool 13 is reduced in diameter and terminates in a tapered hardened point 17. The upper end of the tool is polygonal in cross section as indicated by 18 and may be transversely bored to receive a cross bar or handle 19.

Figure 3:
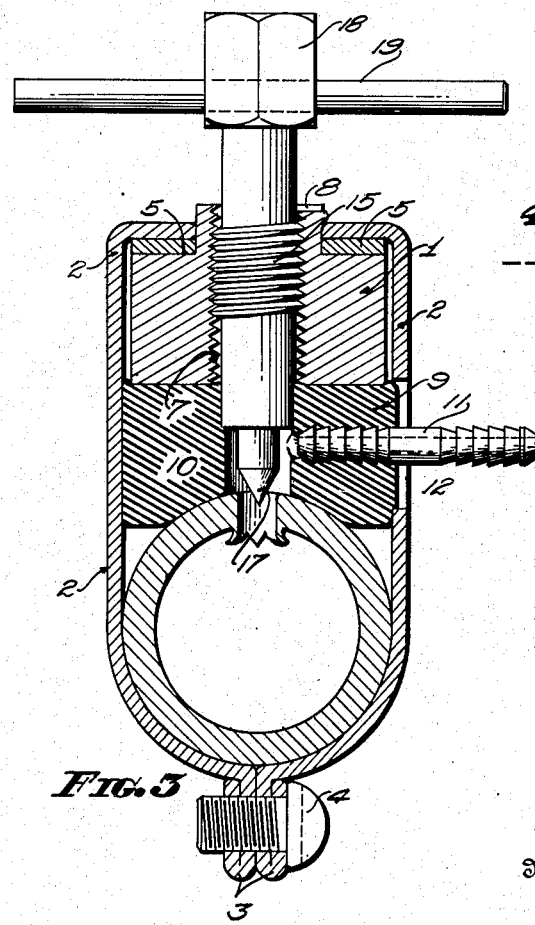
Figure 3 is another enlarged sectional view taken through 3—3 of Fig. 2 showing the saddle valve installed on a pipe line and in its open position.
Figure 2:
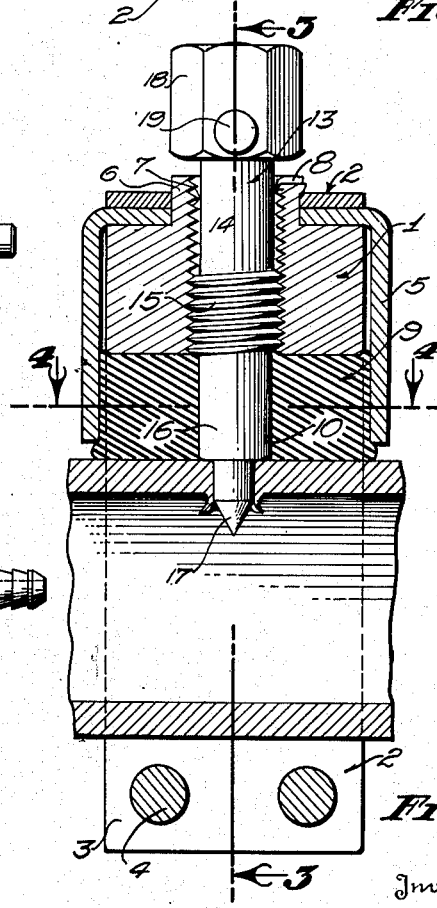
Figure 2 is an enlarged sectional view through 2—2 of Fig. 1 showing the saddle valve installed on a pipe line and in its closed position.

Operation of my saddle valve is as follows:

The valve and penetrating tool 13 is initially placed in its retracted position shown in Figs. 1 and 3. The extremities of the clamp strap 2 are spread and slipped over a pipe P, and the screws 4 tightened. The thickness of the seal plug 9 is such that in order to fasten the clamp strap 2, the seal plug is compressed as shown best in Fig. 3.

After securing the saddle valve, the valve and penetrating tool 13 is turned forcing the tapered point 17 through the wall of the pipe. After penetration the seal block 9 and plug portion 16 prevent any leakage of water or other fluid from the pipe. The tool 13 is then backed off and now functions as a valve to regulate or permit full flow to the outlet nipple 11. After installation, the cross bar 19 may be removed, if desired.

Having thus described a certain embodiment of my invention, I do not desire to be limited thereto, but intend to claim all novelty inherent in the appended claims.

I claim:

1. A saddle valve comprising: a body block; a seal block of yieldable material; means for compressing the seal block between said body block and a pipe to form a sealing connection between said sealing block and said pipe; said body block having a screwthreaded bore and said seal block having an alined bore and a lateral outlet port; and a valve and penetrating tool including a stem screwthreaded in the body block bore, sealingly fitting said seal block bore, and terminating in a pointed end adapted to be forced through said pipe wall.

2. A saddle valve comprising: a seal block of yieldable material having a bore therethrough and a lateral outlet port; means for clamping and sealingly compressing said seal block against the side of a pipe; a valve and penetrating tool having a portion adapted to seal the bore of said seal block and terminating in a pointed end adapted to penetrate said pipe wall; and means for forcing the pointed end of said tool through the wall of said pipe line while sealing the bore of said seal block.

3. A saddle valve comprising: a body block; a seal block of yieldable material; a clamp strap secured to said body block and having clamping extremities adapted to extend on opposite sides of a pipe; screw means for drawing said extremities together thereby to compress and seal said seal block between said body block and pipe; said body block having a screwthreaded bore and said seal block having a bore alined therewith and a lateral outlet port; and a valve and penetrating tool including a stem screwthreaded in the body block bore, sealingly fitting said seal block bore, and terminating in a pointed end adapted to be forced through said pipe wall.

4. A saddle valve comprising: a seal block of yieldable material having a bore therethrough and a lateral outlet port; a frame structure surrounding said seal block and adapted to encircle a pipe to compress and seal said seal block thereagainst; a valve and penetrating tool screwthreaded in said frame and including a plug sealingly fitting said bore and a pointed extremity adapted to penetrate said pipe on screwthreading said tool in said frame, and thereafter serving to control flow from said pipe through said bore to said outlet.

5. A saddle valve comprising: a body block; a seal block of yieldable material; said body block having a screwthreaded bore and said seal block having a bore alined therewith and a lateral outlet port; a clamp strap looped over said block and a pipe and having means to secure said blocks to said pipe to compress and seal said seal block between said body block and pipe; means including said clamp strap covering the sides of said seal block to restrain said seal block against lateral expansion; and a valve and penetrating tool including a stem screwthreaded in the body block bore, sealingly fitting said seal block bore, and terminating in a pointed end adapted to be forced through a wall of said pipe.

EDWIN J. HUNTER.

No references cited.